Figure 1A:
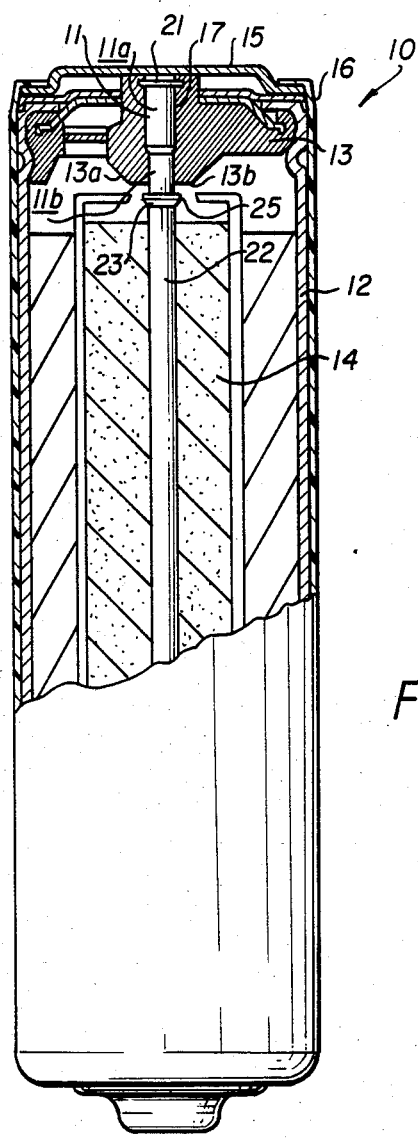

United States Patent [19]

Milewski et al.

[11] Patent Number: 4,606,983

[45] Date of Patent: Aug. 19, 1986

[54] ANCHORED TERMINAL CONDUCTOR

[75] Inventors: Maciej A. Milewski, DuLuth; William P. Delmolino, Dunwoody, both of Ga.

[73] Assignee: Duracell Inc., Bethel, Conn.

[21] Appl. No.: 705,152

[22] Filed: Feb. 25, 1985

[51] Int. Cl.⁴ .............................................. H01M 2/06
[52] U.S. Cl. ..................................... 429/164; 429/181
[58] Field of Search .............. 429/165, 166, 167, 168, 429/169, 170, 171, 178, 179, 180, 181, 182, 183, 184, 164, 56

[56] References Cited

U.S. PATENT DOCUMENTS 1,402,224  1/1922  French ................................. 429/166
3,433,681  3/1969  Jammet ................................ 429/168
3,663,301  5/1972  Ralston et al. ...................... 429/180
4,042,761  8/1977  Nabiullin ............................. 429/165

FOREIGN PATENT DOCUMENTS 2058440  4/1981  United Kingdom .................. 429/56

Primary Examiner—Donald L. Walton
Attorney, Agent, or Firm—Ronald S. Cornell

[57] ABSTRACT

A terminal conductor such as a nail for an electrochemical cell having a top made of a resilient material such as plastic with the conductor having integral anchoring means such as a rounded barb functioning as a buttress to substantially prevent extraction or expulsion of the conductor from the top.

14 Claims, 6 Drawing Figures

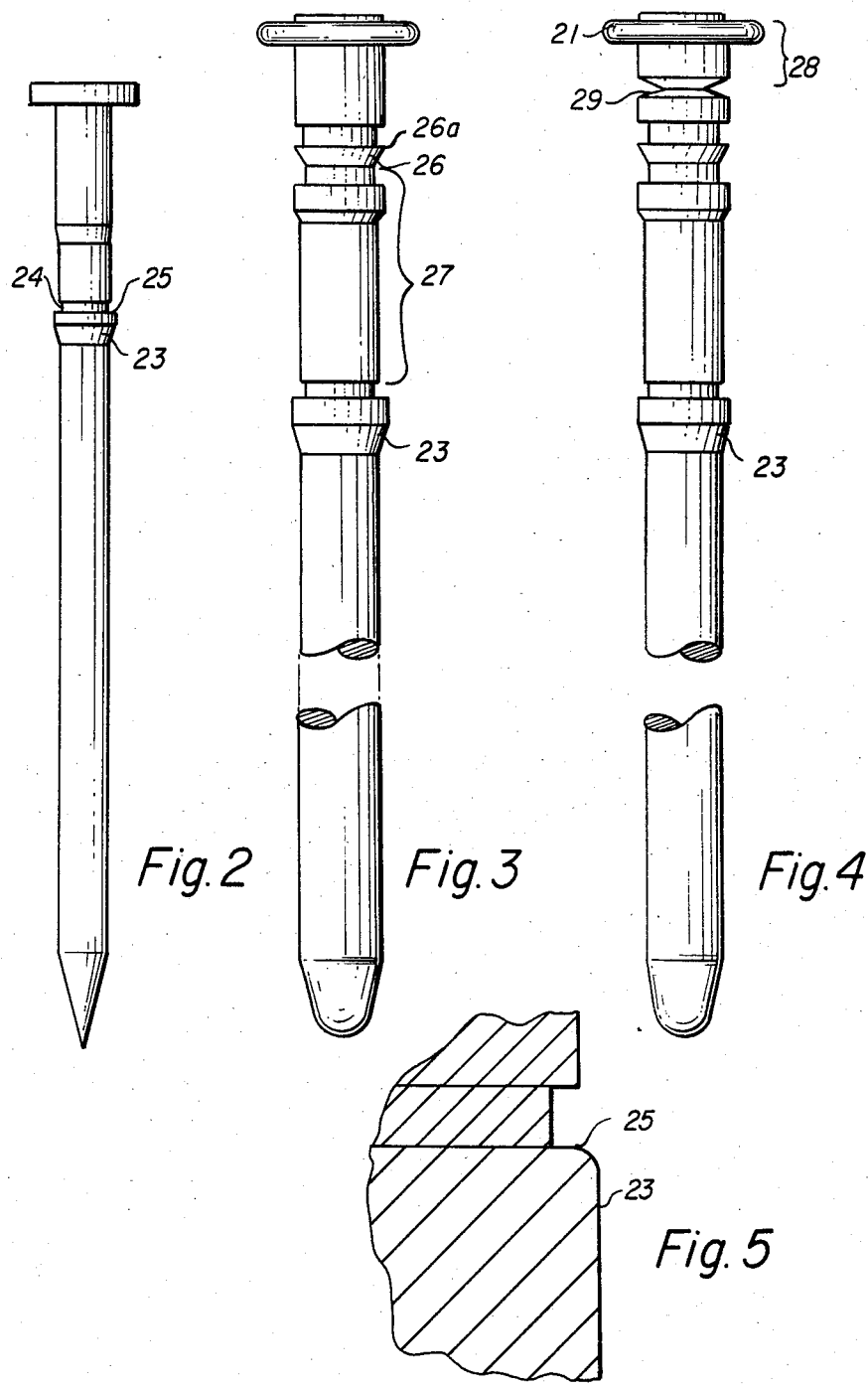

ANCHORED TERMINAL CONDUCTOR

This invention relates to electrode terminal conductors, particularly nail type electrode conductors, and the prevention of their displacement or removal from electrochemical cells.

In electrochemical cells with bobbin type structures such as alkaline cells external electrical connection to the central electrode is generally effected by the use an elongated metal member such as a nail which is inserted or driven through a plastic insulative top member of the cell. The head of the nail remains external (relative to the cell) to the plastic top for electrical connection to a metal cap, plate or the like by physical contact with the nail head with the metal cap or plate closing the cell with the nail therewithin. The shank of the nail (internal to the plastic top) is inserted into the central electrode whereby it functions as a current collector for the electrode (in alkaline cells this electrode is usually the anode) and a portion of the nail shank, near the head, is enclosed by the plastic top and is in sealing engagement therewith.

Removal or even loosening or displacement of the nail from the plastic top, particularly with a somewhat pressurized cell, could be accompanied by an undesirable leakage or spraying of the corrosive alkaline electrolyte through the nail hole. In the past, such occurences have been minimized by the rugged structure of alkaline cells. Such cells were constructed with metal casings or jackets with the ends thereof being crimped over the periphery of the plastic cell top which in turn securely held the edges of metal caps or plates covering the nail head. The crimped end of the metal casings provided sufficient imparted structural strength to securely hold the cap or plate in position thereby preventing outward movement of the nail upon gas pressure build up within the cell. In addition, such metal jackets were relatively difficult to remove from the cell thereby substantially retarding tampering with the cell components and nail removal.

Nail expulsion or displacement and removal has become a problem by the movement of cell manufacturers towards the utilization of plastic casings or jackets (of otherwise high quality) to peripherally hold the metal cap or plate in place. However, such plastic jackets do not have the structural strength of metal to securely hold the normally restraining cap or plate in position.

It is an object of the present invention to provide a structure for a metal conductor such as a nail whereby such conductor is fixedly anchored by the cell top against extrusion or tampering removal whereby cell safety is enhanced.

It is a further object of the present invention to provide such metal conductor whereby it can be anchored to the cell top even when the cell top has already been placed on the cell.

These and other objects, features and advantages of the present invention will become more evident from the following discussion as well as the drawings in which:

FIGS. 1a and b are partially sectioned views of the tops of cells having embodiments of the anchored nail conductor of the present invention;

FIGS. 2–4 are different embodiments of the nail conductor of the present invention; and FIG. 5 is an expanded view of the circled area of the nail conductors of FIGS. 2–4.

Generally the present invention comprises an electrochemical cell having a cell container which is closed by a resilient insulative cell top. An electrode conductor, such as a nail, is inserted through the cell top and into an electrode of the cell with the electrode conductor remaining electrically accessible to the exterior of the cell whereby it functions as a terminal for the electrode. Since the electrode conductor is also generally physically externally accessible as well (particularly if the metal cap covering it is easily removeable) it is accordingly subject to extraction by tampering or to dislodging or expulsion by gas pressure generation within the cell. In accordance with the present invention, means are embodied within the cell to substantially restrict or restrain relative movement between the cell top and the electrode conductor with the electrode conductor being anchored against undesired loosening, expulsion or removal thereof from the cell top. Such restraint means are preferably integral with the conductor in order to provide the requisite degree of anchoring between the conductor and the cell top to prevent or retard such loosening of the conductor. In a preferred embodiment of the present invention the conductor is a nail having radially extending buttressing means on the shank thereof. The buttressing means is positioned on a portion of the nail shank which is interior to the cell top and in close juxtaposition with the bottom peripheral surface of the walls of the aperture through which the nail has been inserted. The buttressing means permits insertion but prevents nail extraction or expulsion by a locking engagement thereof with the cell top. A preferred shape for such buttressing means is a longitudinally directed circumferential barb or several separated and preferably symmetrically positioned barbs integrated with the nail to permit a one way insertion of the nail in the cell top. The barb comprises a wedge shaped cross section (or a simple wedge for each of the separated barbs) with an upper ledge which when fully inserted through the cell top and beyond resists removal of the nail by catching of the ledge with the bottom surface of the aperture walls to effect a locking engagement. With the use of the aforementioned barb the nail can be inserted into an already completed cell without the necessity of pre-anchoring the nail to the cell top before placement of the cell top on the cell (pre-anchoring is of course also possible with the present invention).

The cell top is of a resilient nature thereby permitting the insertion of the barbed nail. With cell tops comprised of a relatively soft material such as polypropylene it is highly preferred that the barb not have a sharp edge since such edge would simply scrape an entry and also exit path through the polypropylene thereby permitting easy removal and negating the locking engagement. A rounding of the barb edge may be required for such applications. (With a plurality of barbs the conductor may be inserted and partially turned to effect a locking engagement in a manner similar to a 'bayonet' connection.) The insertion of a nail conductor in a cell top generally also requires that the nail shank and the cell top, through which it is in contact, are sealingly engaged to prevent leakage. Accordingly, a sealant material is placed between the nail shank and the cell top at their points of contact. A sharp edge for the barb would tend to remove such sealant. Surprisingly the rounded edge does not affect the integrity of the sealant layer. In harder materials such as nylon there is little if any of such scraping of a path or removal of sealant and edge of the barb or barbs need not be rounded.

The extent of protrusion of the buttressing means such as barbs is generally dependent upon the minimum force required for dislodging or removal of the nail. Such minimum force is related to the hardness of the plastic top and its resistance to pulling forces exerted by the barb and the amount of surface area of the cell top in contact with the upper ledge of the barb. Harder materials such as nylon and a greater surface area such as a circumferential barb require a lesser outward protrusion whereas softer materials such as polypropylene and separated barbs may require a greater protrusion to provide a similar minimum extraction or dislodging force. In any event the buttressing means, such as a barb, should not be of an extent of protrusion whereby insertion of the nail into the cell top is precluded or substantially retarded.

Other factors to be considered in determining the extent of barb protruson are the configurations of the nail and the aperture in the plastic cell top through which the nail is inserted. In some cells the nail comprises a broad shank section adjacent the nail head with the cell top aperture being configured to match in order to enhance a sealing relation between the nail and the aperture walls of the cell top. Thus, a barb protrusion extent less than the diameter of the broadest part of the cell top aperture but greater than that of the narrow portion would permit insertion of a barbed nail with little if any effect on the sealing relation between nail and cell top.

The force necessary for removal of an unanchored nail from a cell top is about 15 pounds (about 6.8 kg) and it is desireable that such force be increased to at least about 25 lb (about 11.4 kg). Force testing procedures differ however and a general rule of thumb is that the anchored force be at least 50% greater than the unanchored force and preferably at least 100% greater.

In addition to the buttressing means such as the above described barb or barbs, secondary features may be utilized to enhance withdrawal force required to remove the nail or to prevent nail extraction. Sealing reliability may also be enhanced. For example, a sharp edge barb may be integrated with the portion of the nail remaining in contact with the aperture walls of the cell top. In hard cell top materials such as nylon such barb would tend to bit into the walls of the cell top aperture and thus act as a secondary buttress. In softer materials such as polypropylene the sharp edge, as described above, would scrape the aperture walls with scraped material being deposited between the nail and the aperture walls in the area between the sharp edged barb and the restraining barb, which acts as the anchor beyond the bottom surface of the cell top. Such deposited polypropylene enhances the sealing relationship between the nail and aperture wall, in such area, and increases the amount of frictional engagement therebetween thereby increasing the force required for nail extraction.

In a further embodiment, the nail may be provided with a deliberately weakened section in the shank portion which is embedded in the cell top. In such embodiment, the force required for breaking of such weakened section is less than that required for nail extraction. As a result, extraction tampering with the nail results in the nail head breaking off and the remainder of the nail not being readily removed from the cell top.

Figure 1B:
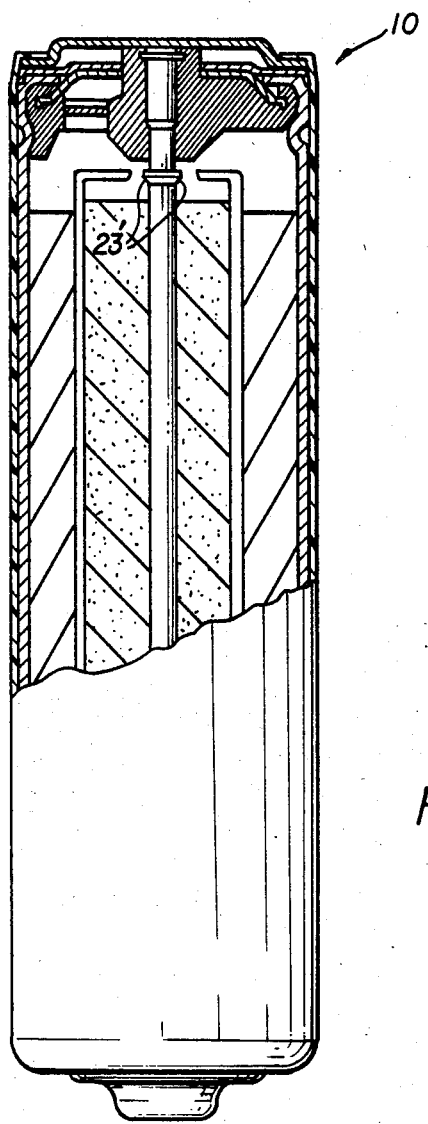

With specific reference to the drawings, FIG. 1a shows a cell container 12 closed with polypropylene cell top 13. The cell top 13 has a central aperture 13a through which nail conductor 11 is inserted for electrical engagement with anode 14. Metal cap 15 is welded to nail head 21 and is peripherally engaged to the ends of plastic outer jacket 16. As a result there is little engagement force to retain the metal cap 15 on the cell 10. Nail conductor 11 would therefore normally be readily moveable or subject to easy dislodgement. To prevent such occurrence, nail shank 22 of has a circumferential barb 23 which is positioned below the bottom surface 13b of the walls of aperture 13a with the ledge 25 of such barb engaging such bottom surface in resisting dislodging or extraction forces. The portion of the nail shank 22 embedded in the cell top 13 has broad and narrow diameter sectons 11a and 11b with corresponding configuration of aperture 13a. Sealant 17 is disposed between broad portion 11a and the walls of aperture 13a to prevent leakage therebetween. In conjunction therewith the diameter of circumferential barb 23 is slightly less than the diameter of broad portion 11a whereby the barb 23, when inserted into aperture 13, does not scrape the aperture wall adjacent broad portion 11a and remove sealant material placed there. FIG. 1b shows a cell having an identical configuration except for the configuration of the barb section of the nail which is comprised of separated barbs 23' which function in an analogous manner as the circumferential barb of FIG. 1a. The barbs 23 and 23' are shown as being slightly spaced from the bottom surface 13b of the walls of aperture 13a in order to allow for tolerances in dimension of the plastic cell top. Such spacing should however be minimized to avoid detrimental partial dislodgement of the nail.

The nail in FIG. 2 differs slightly from the nail shown in FIG. 1a with the presence of circumferential cutout 24. Such cutout results from the formation of barb 23 with material being moved from the nail at such point to form the barb. A nail with barb configurations as in FIGS. 1a and b can be made by simple initial casting of the nail with the desired barb. The nail in FIG. 2 however represents a modification of an existing nail. Such latter configuration with cutout 24 is further advantageous since it provides an elongation of the ledge area 25 without additional outward extension of the barb. The resilient plastic cell top extends partially into such cutout with resultant increased retaining power of the barb 23. Nails used as terminal conductors in electrochemical cells are generally formed from wire stock of materials such as brass, nickel-silver and tin plated steel. The tin plated steel presents the most difficulty in making the nail in FIG. 2 because of plating complications. However, the metal top welded thereto is the most difficult to remove.

The nail in FIG. 3 additionally differs from the nail in FIG. 2 by the inclusion of scraping element 26 with a sharp edge 26a. When the nail is inserted into a polypropylene cell top such as shown in FIGS. 1a and b edge 26a scrapes polypropylene ahead of itself into the area 27 to enhance the sealing relationship between the nail and the cell top aperture walls as well as the frictional engagement therebetween with some increase in the force required for extraction.

The nail in FIG. 4 has an additional feature in the circumferential notch 29 in the nail shank adjacent nail head 21. This notch weakens the nail shank at such point to an extent whereby prying of the nail head against the anchoring force exerted by anchoring barb 23 results in the breaking off of section 28 from remainder of the nail shank which remains embedded in the plastic. As a result, tampering removal of the nail, with concomitant opening of the aperture 13 and possible expulsion of corrosive alkaline electrolyte is substantially precluded.

FIG. 5 is an enlarged portion of the anchoring barb section of the nails shown in FIGS. 2–4 particularly suited for use with a relatively soft plastic cell top. The barb 23 has a ledge 25 with the end of such ledge being rounded to remove sharp edges which may undesirably scrape an exit path in the polypropylene top through which the barb 23 can be readily withdrawn. In addition such rounding substantially prevents removal of sealant material particularly in cells wherein the cells top aperture and the nail shank are of a uniform diameter.

It is understood that the above description of the drawings is illustrative in nature and that changes may be made in the configuration, component materials, component relations and the like without departing from the scope of the present invention as defined in the following claims.

What is claimed is:

1. An electrochemical cell comprising a cell container which is closed by a resilient insulative cell top and an electrode conductor inserted through said cell top and into an electrode of the cell, with said electrode conductor being physically and electrically accessible to the exterior of the cell whereby it functions as a terminal for the electrode, and wherein a portion of said electrode conductor is enclosed within said cell top, characterized in that said cell further comprises means for substantially restraining movement of said electrode conductor relative to said cell top, wherein said electrode conductor has a nail configuration comprising a head and a shank with the head of said nail providing said external physical and electrical accessibility, wherein said restraining means is integrated with the shank of said nail, wherein said restraining means is positioned on said shank, interior to said cell container and below the interior surface of said cell top and in close juxtaposition to said interior surface, and wherein said restraining means comprises a circumferential barb longitudinally disposed on said shank and having an upper portion which engages said interior surface to provide said substantial restraining of movement.

2. The cell of claim 1 wherein said circumferential barb has a rounded outwardly protruding edge.

3. The cell of claim 2 wherein said enclosed portion of said nail shank is sealingly engaged to said cell top.

4. The cell of claim 3 wherein said resilient cell top is comprised of polypropylene.

5. The cell of claim 1 wherein said nail shank further comprises a circumferential cutout positioned directly above said barb whereby an inwardly extending ledge is formed for increased restraining contact between said cell top and said upper portion of said barb.

6. The cell of claim 1 wherein said nail shank is comprised of broad and narrow diameter portions with the broad portion being adjacent said nail head and in sealing relation to said cell top, wherein the diameter of said barb is greater than the diameter of said narrow portion and less than that of said broad portion.

7. An electrochemical cell comprising a cell container which is closed by a resilient insulative cell top and an electrode conductor inserted through said cell top and into an electrode of the cell, with said electrode conductor being physically and electrically accessible to the exterior of the Cell whereby it functions as a terminal for the electrode, and wherein a portion of said electrode conductor is enclosed within said cell top, characterized in that said cell further comprises means for substantially restraining movement of said electrode conductor relative to said cell top, wherein said electrode conductor has a nail configuration comprising a head and a shank with the head of said nail providing said external physical and electrical accessibility, wherein said restraining means is integrated with the shank of said nail, wherein said restraining means is positioned on said shank, interior to said cell container and below the interior surface of said cell top and in close juxtaposition to said interior surface, and wherein said restraining means comprises two or more barbs with each being longitudinally disposed on said shank and having an upper portion which engages said interior surface to provide said substantial restraining of movement.

8. The cell of claim 7 wherein said nail shank is comprised of broad and narrow diameter portions with the broad portion being adjacent said nail head and in sealing relation to said cell top, wherein said barbs extend beyond the diameter of said narrow portion and protrude to an extent less than that of said broad portion.

9. An electrochemical cell comprising a cell container which is closed by a resilient insulative cell top and an electrode conductor inserted through said cell top and into an electrode of the cell, with said electrode conductor being physically and electrically accessible to the exterior of the cell whereby it functions as a terminal for the electrode, and wherein a portion of said electrode conductor is enclosed within said cell top, characterized in that said cell further comprises means for substantially restraining movement of said electrode conductor relative to said cell top, wherein said electrode conductor has a nail configuration comprising a head and a shank with the head of said nail providing said external physical and electrical accessibility, wherein said restraining means is integrated with the shank of said nail, wherein said restraining means is positioned on said shank, interior to said cell container and below the interior surface of said cell top and in close juxtaposition to said interior surface, wherein additional means for restraint are integrated with said enclosed portion of said nail shank, wherein said additional restraint means comprises a sharp edge circumferential barb, and wherein said resilient cell top is comprised of polypropylene and said sharp edge scrapes said polypropylene into an area, longitudinally between said sharp edge and said restraining means and circumferentially between said enclosed nail shank and enclosing cell top whereby sealing and frictional resistance therebetween is enhanced.

10. An electrochemical cell comprising a cell container which is closed by a resilient insulative cell top and an electrode conductor inserted through said cell top and into an electrode of the cell, with said electrode conductor being physically and electrically accessible to the exterior of the cell whereby it functions as a terminal for the electrode, and wherein a portion of said electrode conductor is enclosed within said cell top, characterized in that said cell further comprises means for substantially restraining movement of said electrode conductor relative to said cell top, wherein said electrode conductor has a nail configuration comprising a head and a shank with the head of said nail providing said external physical and electrical accessibility, wherein said restraining means is integrated with the shank of said nail, wherein said restraining means is positioned on said shank, interior to said cell container and below the interior surface of said cell top and in close juxtaposition to said interior surface, and wherein means are provided on said enclosed portion of said nail shank whereby a prying force, less than that required for nail extraction, exerted on said nail head breaks off said nail head.

11. An electrochemical cell comprising a cell container which is closed by a resilient insulative cell top and an electrode conductor inserted through said cell top and into an electrode of the cell, with said electrode conductor being physically and electrically accessible to the exterior of the cell whereby it functions as a terminal for the electrode, and wherein a portion of said electrode conductor is enclosed within said cell top, characterized in that said cell further comprises means for substantially restraining movement of said electrode conductor relative to said cell top, wherein said electrode conductor has a nail configuration comprising a head and a shank with the head of said nail providing said external physical and electrical accessibility, wherein said restraining means is integrated with the shank of said nail, wherein said restraining means is positioned on said shank, interior to said cell container and below the interior surface of said cell top and in close juxtaposition to said interior surface, wherein additional means for restraint are integrated with said enclosed portion of said nail shank, and wherein means are provided on said enclosed portion of said nail shank whereby a prying force, less than that required for nail extraction, exerted on said nail head breaks off said nail head.

12. An electrochemical cell comprising a cell container closed by a polypropylene cell top, a nail, comprising a head and a shank, inserted through said cell top into electrical connection with an anode contained within said cell, with the head of said nail being external to said cell container and enclosed by and electrically connected to a metal cap member which comprises the external anode terminal and a portion of the shank of said nail being sealingly enclosed within said cell top, said metal cap member being peripherally covered with the ends of a plastic jacket for said cell, characterized in that said cell further comprises means for substantially restraining movement of said nail relative to said cell top, comprising a barb, having an outwardly protruding rounded edge, longitudinally disposed on a portion of said shank interior to said cell container and below the interior surface of said cell top and in close juxtaposition to said interior surface with said barb having an upper portion which engages said interior surface to provide said substantial restraining of movement.

13. The cell of claim 12 wherein said nail shank further comprises a circumferential cutout positioned directly above said barb whereby an inwardly extending ledge is formed for increased restraining contact between said cell top and said upper portion of said barb.

14. The cell of claim 13 wherein additional means for restraint are integrated with said enclosed portion of said nail shank comprising a sharp edge circumferential barb, with said sharp edge scraping said polypropylene into an area, longitudinally between said sharp edge and said restraining means and circumferentially between said enclosed nail shank and enclosing cell top whereby sealing and frictional resistance therebetween is enhanced and wherein said enclosed nail shank adjacent said nail head is notched whereby a prying force, less than that required for nail extraction, exerted on said nail head breaks off said nail head.

* * * * *